(12) United States Patent
Peyron

(10) Patent No.: US 9,127,623 B2
(45) Date of Patent: Sep. 8, 2015

(54) THRUST REVERSER DEVICE

(71) Applicant: AIRCELLE, Gonfreville l'Orcher (FR)

(72) Inventor: Vincent Peyron, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/271,626

(22) Filed: May 7, 2014

(65) Prior Publication Data

US 2015/0176528 A1  Jun. 25, 2015

Related U.S. Application Data

(63) Continuation of application No. PCT/FR2012/052408, filed on Oct. 22, 2012.

(30) Foreign Application Priority Data

Nov. 7, 2011  (FR) ..................................... 11 60055

(51) Int. Cl.
*F02K 1/76* (2006.01)
*F02K 1/72* (2006.01)
(Continued)

(52) U.S. Cl.
CPC . *F02K 1/763* (2013.01); *F02K 1/72* (2013.01); *F02K 1/32* (2013.01); *F02K 1/54* (2013.01); *F02K 1/56* (2013.01); *F02K 1/70* (2013.01); *F05D 2260/901* (2013.01); *F05D 2270/66* (2013.01); *Y02T 50/671* (2013.01)

(58) Field of Classification Search
CPC ........... Y02T 50/671; F02K 1/54; F02K 1/56; F02K 1/563; F02K 1/566; F02K 1/58; F02K 1/60; F02K 1/605; F02K 1/62; F02K 1/625; F02K 1/64; F02K 1/70; F02K 1/72; F02K 1/32
See application file for complete search history.

(56) References Cited

U.S. PATENT DOCUMENTS 3,614,037 A    10/1971  Vdolek et al.
5,228,641 A     7/1993  Remlaoui
(Continued)

FOREIGN PATENT DOCUMENTS

FR    1 466 840 A    1/1967
FR    2 379 705 A1   9/1978
(Continued)

OTHER PUBLICATIONS

International Search Report issued Dec. 17, 2012 in International Application No. PCT/FR2012/052408.

*Primary Examiner* — Craig Kim
(74) *Attorney, Agent, or Firm* — Brinks Gilson & Lione

(57) ABSTRACT

A thrust reverser device for a turbojet engine nacelle includes a cowl mounted translating between a closing position and an opening position in which the cowl opens a passage in the nacelle and uncovers deflecting cascades. The cowl is associated with a blocking flap pivotally mounted on the cowl between a retracted position and a pivoted blocking position in which the blocking flap closes partially an air flow path of the nacelle. The blocking flap is equipped with a driving mechanism including an assembly forming a lever pivotally mounted on the cowl and articulated at each of ends of the lever, by means of driving links, respectively on the blocking flap and on a fixed structure of the thrust reverser device. In particular, the assembly and the driving links are articulated in an articulation plane substantially perpendicular to the blocking flap and substantially radial to the thrust reverser device.

10 Claims, 3 Drawing Sheets

(51) Int. Cl.
- *F02K 1/56* (2006.01)
- *F02K 1/54* (2006.01)
- *F02K 1/32* (2006.01)
- *F02K 1/70* (2006.01)

(56) References Cited

U.S. PATENT DOCUMENTS

| | | | |
|---|---|---|---|
| 6,764,045 B2 * | 7/2004 | Sternberger | 244/110 B |
| 6,895,742 B2 * | 5/2005 | Lair et al. | 60/226.2 |
| 6,976,352 B2 * | 12/2005 | Lair | 60/226.2 |
| 7,600,371 B2 * | 10/2009 | Sternberger | 60/226.2 |
| 8,109,467 B2 * | 2/2012 | Murphy | 244/110 B |
| 2004/0195443 A1 * | 10/2004 | Lair | 244/110 B |
| 2005/0151012 A1 | 7/2005 | Lair | |
| 2006/0288688 A1 * | 12/2006 | Lair | 60/226.2 |
| 2007/0234707 A1 | 10/2007 | Beardsley | |
| 2014/0150403 A1 * | 6/2014 | Stuart et al. | 60/204 |

FOREIGN PATENT DOCUMENTS

| | | |
|---|---|---|
| FR | 2 952 128 A1 | 5/2011 |
| GB | 2 045 179 A | 10/1980 |

\* cited by examiner

THRUST REVERSER DEVICE

CROSS-REFERENCE TO RELATED APPLICATIONS

This application is a continuation of International Application No. PCT/FR2012/052408, filed on Oct. 22, 2012, which claims the benefit of FR 11/60055, filed on Nov. 7, 2011. The disclosures of the above applications are incorporated herein by reference.

FIELD

The present disclosure relates to a thrust reverser, called cascade-type thrust reverser, for a jet engine.

BACKGROUND

The statements in this section merely provide background information related to the present disclosure and may not constitute prior art.

An aircraft is driven by several turbojet engines each housed in a nacelle which also houses a set of auxiliary actuating devices associated with the operation thereof and performing various functions when the turbojet engine is operating or stopped. These auxiliary actuating devices comprise in particular a mechanical thrust reversal system.

A nacelle generally has a tubular structure comprising an air inlet upstream of the turbojet engine, a median section intended to surround a fan of the turbojet engine, a downstream section housing thrust reversal means and intended to surround the combustion chamber of the turbojet engine, and is usually ended by an ejection nozzle, the outlet of which is located downstream of the turbojet engine.

Modern nacelles are intended to house a turbofan engine capable of generating, through rotating fan blades, hot air flow (also called primary flow) originating from the combustion chamber of the turbojet engine, and cold air flow (secondary flow) which flows outside the turbojet engine through an annular passage, also called flow path, formed between a fairing of the turbojet engine and an inner wall of the nacelle. The two air flows are ejected from the turbojet engine through the rear of the nacelle.

The role of a thrust reverser, during landing of an aircraft, is to improve the braking ability thereof, by redirecting forward at least a portion of the thrust generated by the turbojet engine. In this phase, the thrust reverser obstructs the flow path of cold air flow and directs it towards the front of the nacelle, thereby generating a counterthrust which adds to the braking of the aircraft wheels.

Means implemented to achieve this cold flow redirection vary depending on the type of thrust reverser. However, in all cases, the structure of a thrust reverser comprises movable cowls displaceable between, on the one hand, a deployed position in which they open a passage in the nacelle for the diverted flow and, on the other hand, a retracted position in which they close this passage. These cowls can fulfill a function of deflection or simply activation of other diverting means.

In the case of a cascade-type thrust reverser, redirection of the air flow is performed by deflecting cascades, the cowl only having a mere sliding function intended to uncover or recover these cascades. Complementary blocking doors, also called flaps, activated by the sliding of the cowling, usually make it possible to close the flow path downstream of the cascades so as to allow redirection of cold flow towards the cascades.

These flaps are pivotally mounted on the sliding cowl between a retracted position in which they ensure, with said movable cowl, the aerodynamic continuity of the inner wall of the nacelle, and a deployed position in which, in a thrust reversal situation, they close at least partially the annular channel in order to divert a gas flow towards the deflecting cascades uncovered by the sliding of the movable cowl.

The pivoting of the flaps is guided by links attached, on the one hand, to the flap, and on the other hand, to a fixed point of the inner structure delimiting the annular channel.

Such a configuration of the prior art has several problems, namely, in particular, problems of differing opening kinematics between the translational movement of the cowling and the pivoting of the flaps, problems of aerodynamic disturbances due to the driving links passing through the flow path, problems of acoustic performances due to the installation of fixed articulation points which reduces the surface of the inner structure which can be used for an acoustic treatment, and mechanical problems due to the mechanical connection by the links between the thrust reverser and the inner structure.

The problem of the kinematics of the flaps opening degree with respect to the sliding of the cowl and, consequently, the problem of the management of the total cross-sectional area of air flow, is a particularly important issue.

Indeed, during a transition phase between opening and closure of the thrust reverser, the opening of the flaps, at the beginning of the opening phase of the mobile cowl, is faster than the rearward movement of said cowl.

There is often a kinematics sensitive point which places the flap in a position of partial obstruction of the annular channel without the obstructed section being completely compensated by the upstream section uncovered by the rearward movement of the mobile cowl.

The upstream section of passage through the thrust reverser cascades being lower than the section of the flow path which is obstructed by the flaps, this results in an increase of pressure in the engine, which makes it sensitive to manage the turbojet engine conditions in this transitional phase.

Several solutions have been implemented so as to solve one or more of these problems.

Thus, it is known to provide a thrust reverser architecture which no longer comprises a link passing through the annular channel.

For example, this objective can be achieved by providing for driving links articulated on the mobile flap and connected in the vicinity of the rear frame of the deflecting cascades. Such a solution is described in documents U.S. Pat. No. 5,228,641 and US 2007/0234707 for example.

Yet, such an architecture is unsuitable for turbojet engines with high bypass ratio.

Indeed, with this type of turbojet engine, the cascades length and, consequently, the movement of the cowl downstream of the nacelle to uncover the cascades, must be significant.

However, due to lack of available space in the nacelle, the length of the links cannot be sufficient to achieve opening kinematics adapted to the flaps and the cowl.

As a result, the flap is deployed very rapidly in the annular channel at the beginning of the rearward stroke of the sliding cowl, causing a significant increase in pressure in the annular channel.

It does not therefore solve the problem of appropriate management of the total cross-sectional area of air flow in the nacelle.

In addition, such a system raises problems of flow path sealing, as the sealing diaphragm has to be placed above the deflecting cascades. This implies, in particular, the transfer of the forces exerted on the flaps through fittings sliding between two cascades, which puts an additional burden on the structure and makes it more difficult to carry out.

Other devices which make it possible to adapt the kinematics of opening of the flap with respect to that of the rearward movement of the cowl are also known, in particular by setting some delay in the opening of the flap, thereby preventing an increase in pressure in the flow path.

However, the opposite disadvantage occurs, the upstream section of the air passage through the thrust reverser cascades, added to that of the two air flows in a direct jet mode being too significant compared to the air inlet section of the nacelle. Such a situation is also detrimental to the turbojet engine.

Furthermore, other devices providing an architecture lacking the link in the flow path provide for flaps sliding along suitable rails via rollers, along the movable cowl when its moves downstream of the nacelle.

However, these devices have deficiencies in terms of mechanical reliability, as they are subject to the wear of the movable parts, such as the rollers, the forces being applied point-wise on very small contact surfaces.

Therefore, there exists a need for improving thrust reverser devices lacking a link in the annular channel in order to overcome the aforementioned limitations. These solutions should, in particular, allow for an isostatic driving of the flaps, that is to say, a position of the movable cowl of the thrust reverser corresponds to a position of the flap, and use of conventional joints between the mechanical elements which do not require any point-wise contact or linear contact (as with rollers or balls) in order to limit the wear of the movable parts.

A first solution has been developed and described in French patent application FR 2 952 128 on behalf of the applicant.

The document FR 2 952 128 describes such a thrust reverser device equipped with at least one blocking flap pivotally mounted via one end on the movable cowl and associated with a driving system comprising at least one assembly forming a lever pivotally mounted on the cowl and articulated at each of the ends thereof, by means of driving links, respectively on the flap and on a fixed structure of the device.

Such a device makes it possible to eliminate the flap driving links placed into the flow path and the opening kinematics of the flap and the cowl is brought under control in order to ensure an almost constant air exhaust section in the nacelle, particularly when the thrust reverser device is in the configuration of a beginning of transit wherein the opening of the deflecting means by a translational movement of the movable cowl is low.

SUMMARY

The present disclosure provides a thrust reverser device for a turbojet engine nacelle comprising at least one cowl mounted so as to move in a translational manner in a direction substantially parallel to a longitudinal axis of the nacelle between a closing position in which it provides the aerodynamic continuity of the nacelle and covers deflecting means for deflecting at least a portion of an air flow of the turbojet engine, and an opening position in which it opens a passage in the nacelle and uncovers said deflecting means, the movable cowl being associated with at least one blocking flap pivotally mounted via one end on the movable cowl between a retracted position corresponding to the closing position of said movable cowl and a blocking pivoted position corresponding to the opening position of the movable cowl and in which it closes at least partially an air flow path of the nacelle, the blocking flap being equipped with at least one driving mechanism comprising at least one assembly forming a lever pivotally mounted on the cowl and articulated at each of the ends thereof, by means of driving links, respectively on the flap and on a fixed structure of the device, characterized in that the assembly forming a lever and the associated links are articulated in a plane substantially perpendicular to the flap and substantially radial to the thrust reverser device.

Thus, by providing for an articulation and an arrangement of the driving elements in a plane substantially perpendicular to the flap, it is possible to greatly reduce the overall dimensions and complexity of the driving system while maintaining the aforementioned advantages.

In one form, the lever assembly comprises a first and a second lever arms each respectively fixed, by means of driving links, on a front frame and on the flap and pivotally mounted on the cowl.

In another form, when the thrust reverser device is in the opening position and the flap in a blocking pivoted position, the lever forms with the driving link connected to the fixed structure of the device, an angle substantially equal to 160 degrees.

Indeed, it has been found that such geometry makes it possible to obtain the most significant rotation of the lever. This results in slower rotation of the blocking flap, which makes it possible to provide a ratio of the reverse jet and direct jet surfaces as close as possible to unity.

Such geometry further makes it possible to maintain a margin of alignment of the first link connected to the fixed structure and the lever. Indeed, in the case of perfect alignment of these two elements, the mechanism is likely to be in an unstable position preventing re-closing at the end of the thrust reversal phase.

Advantageously, the angle is obtained by providing for a lever length substantially equal to half the stroke of the movable cowl between its closing position and its opening position.

In one form, the lever length tolerance ranges between 5 and 10 mm.

Advantageously, at least a portion of the lever elements and the links of the driving mechanism are adapted to imbricate into each other when the flap is in the retracted position. This may in particular be achieved by duplicating one or more links or levers with small links substantially parallel to each other. Thus, in a folded position, the lever or the associated link can be housed between the small links.

According to a first form, the articulation plane of the driving mechanism comprises a center axis of the flap.

Advantageously, the flap is in the retracted position, the driving mechanism is folded and housed substantially in the plane of the flap at the center axis of said flap. If necessary, an articulated fairing or valve may be provided to cover the housing and provide the aerodynamic optimization of the inner surface of the flap when it is in the retracted position.

According to a second form, the driving mechanism is substantially located between two flaps. The driving mechanism may then drive two adjacent flaps, which reduces the total number of driving systems. Furthermore, in such a configuration, it is no longer necessary to provide for a housing in the middle of the flap and the structural integrity of said flap is preserved.

The present disclosure also relates to a nacelle for a turbofan engine comprising a thrust reverser device according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
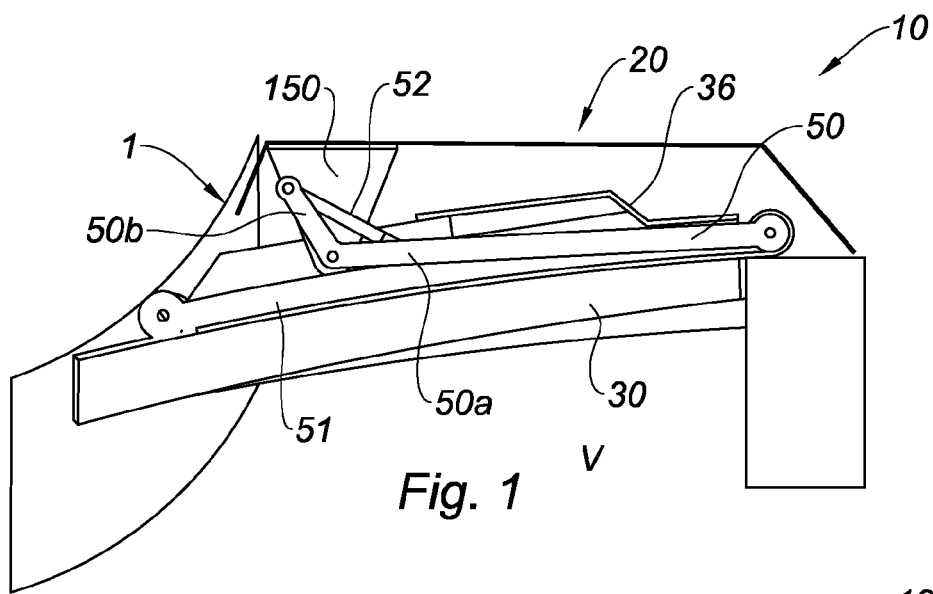
FIG. 1 is a longitudinal sectional view of a thrust reverser device according to a first form of the present disclosure and having a blocking flap in a retracted position.
Figure 2:
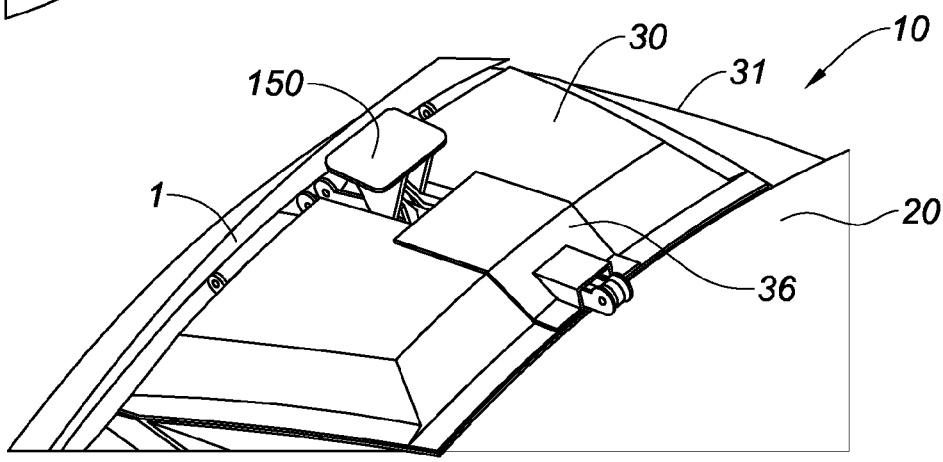
FIG. 2 is a partial perspective view shown from the top of the thrust reverser device according to a first form of the present disclosure of FIG. 1.
Figure 3:
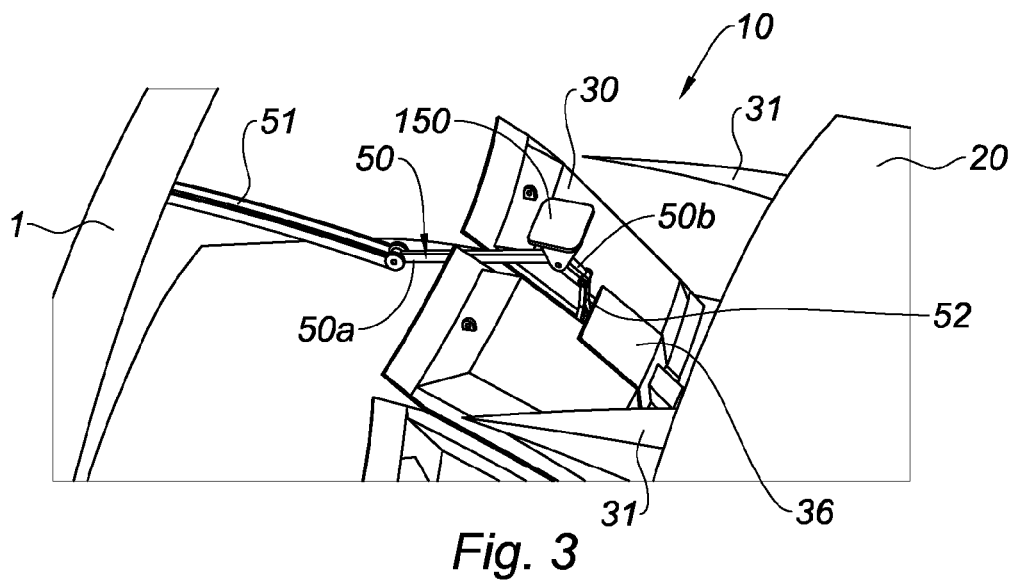
FIG. 3 is a view similar to the view of FIG. 2, the blocking flap being in a pivoted position.
Figure 4:
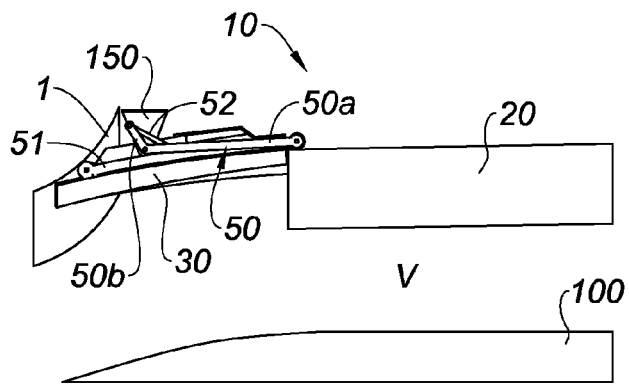
FIGS. 4-8 are schematic figures showing various driving steps of the blocking flap.
Figure 5:
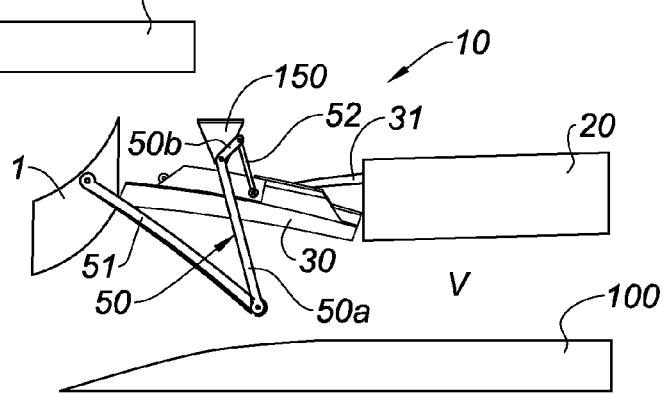
Figure 6:
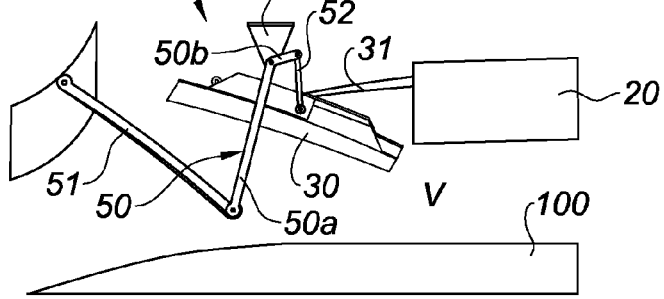
Figure 7:
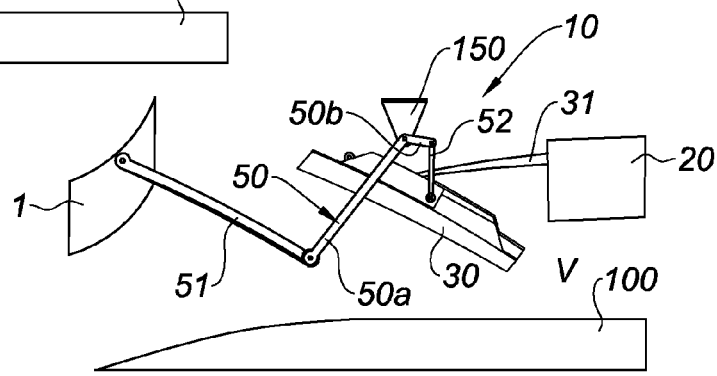

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In a manner known per se, a thrust reverser device designated by the general reference 10 is associated with a turbofan engine and belongs to an outer nacelle (not shown) which defines, with a concentric inner structure 100, a flow annular channel or flow path V of a secondary flow of the turbojet engine.

As schematically illustrated, the thrust reverser device 10 comprises a stationary front frame 1 extended by a cowl 20 (partially shown) mounted to slide thanks to rails, along the longitudinal axis of the nacelle.

The front frame 1 supports a plurality of deflecting cascades housed within the thickness of the movable cowl 20, when the latter is in a closing position.

The translational movement of the movable cowl 20 downstream of the nacelle clears within the nacelle an opening through which the secondary air flow of the turbojet engine may escape at least partially, this portion of the air flow being redirected towards the front of the nacelle by means of the deflecting cascades, thereby generating a counterthrust adapted to assist in the braking of the aircraft.

In order to increase the portion of the secondary air flow passing through the cascades, the thrust reverser device 10 comprises a plurality of blocking flaps 30 distributed over the circumference of the cowl 20, and each pivotally mounted via one end around an articulation axis 31, on the sliding cowl 20 between a retracted position in which the flap 30 closes the opening and provides the inner aerodynamic continuity of flow path V and a deployed position in which, in a thrust reversal situation, it closes at least partially the flow path V in order to divert a gas flow towards the cascades 2 opening.

In order to take into account the reduction in the circumference of the flow path between their retracted position (maximum circumference away from the center) and their pivoted position (minimum circumference close to the center), the flaps 30 has a substantially trapezoid shape. Inter-flaps 31 provide the aerodynamic junction when they are in the retracted position.

When the turbojet engine is operating in a direct thrust mode, the sliding cowl 20 forms all or part of a downstream portion of the nacelle, the flaps 30 being then retracted into the sliding cowl 20 which closes the cascades opening.

To reverse the thrust of the turbojet engine, the sliding cowl 20 is moved in a downstream position and the flaps 30 are pivoted in an obstruction position so as to divert the secondary air flow towards the cascades and form a reverse air flow guided by the cascades.

It should be noted that in the form illustrated in the figures, the pivoting of the flap 30 around its articulation axis transverse to the longitudinal axis of the nacelle is provided through ball joints, at the upstream end thereof. It is of course possible to carry out an articulation of the flap 30 downstream in the flow path V, via the downstream end thereof.

With reference to FIGS. 1 to 11, the flaps 30 of the thrust reverser device 10 are equipped with a driving system allowing for pivoting of said flaps 30 relative to the cowl 20 according to suitable kinematics.

To this end, and according to the present disclosure, the driving system of the flap 30 comprises at least an assembly forming a lever 50 pivotally mounted by means of a pivot 150 on the movable cowl 20 and articulated at each of the ends thereof, respectively by means of a first driving link 51 and a second driving link 52, respectively on the fixed structure of the device, namely the front frame 1, and on the flap 30.

Also according to the present disclosure, the assembly forming a lever 50 and the links 51, 52 are articulated in a plane substantially perpendicular to the flap and substantially radial to the thrust reverser device.

Such a driving system 40 makes it possible to transform the translational movement of the cowl 20 towards the downstream of the nacelle (and reversibly, towards the upstream of the nacelle) into a rotational movement of the assembly forming a lever 50, this rotational movement being then transferred back to actuate the driving link(s) so as to pivot the flap 30 in a particular position such as its deployed position, its retracted position or any position called transit position between the two aforementioned positions.

Specifically, the assembly forming a lever 50 comprises two separate lever arms 50a and 50b forming an overall V-shape, the tip of which is pivotally mounted around a pivot axis perpendicular to the plane containing the articulation axis of the flap 30 and parallel to the longitudinal axis of the nacelle, by means of an articulation fitting 150 integral with the cowl 20, and more specifically connected to a sealing diaphragm fitted to said cowl 20. In the following description, this plane will be referred to as plane P.

The first lever arm 50a is fixed to the front frame 1 by means of the first link 51 articulated around an axis parallel to the articulation axis of the flap 30.

The second lever arm 50b is fixed, in turn, by a first ball joint at one end of the second link 52 connected, at an opposite end, by a second ball joint at the downstream end of the reversal flap 30.

Thus, the first link 51, the lever 50 and the second link 52 belong to the same articulation plane substantially perpendicular to the plane of the flap 30.

Moreover, by providing that the lever 50 and the links 51, 52 are arranged in this same plane substantially normal to the flap, the overall dimensions of the driving system 40 can be minimized when said driving system is in a position of folded flap 30. Specifically, it may be provided that the lever 50 and the links 51, 52 are folded by imbricating fully or partially into each other. It is also possible to provide for thus housing the driving systems 40 in the thickness of the flap 30.

Figure 8:
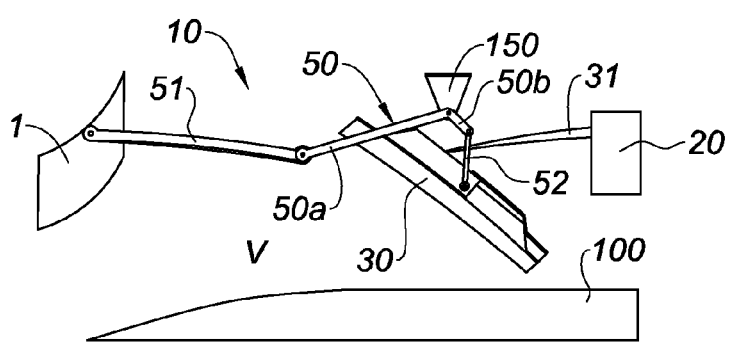

FIGS. 4 to 8 show various deployment steps of the flap 30 from its folded position corresponding to a direct jet position (FIG. 4) to its pivoted position corresponding to a thrust reversal position (FIG. 8).

As shown in the pivoted position in FIG. 8, it is advantageous, within the scope of the present disclosure, that when the thrust reverser device 10 is in an opening position and the flap 30 in a pivoted blocking position, the lever 50 forms with the driving link 51 connected to the fixed structure 1 of the device, an angle substantially equal to 160 degrees.

This is in particular achieved by providing that the lever 50, and more precisely its first branch 50a, has a length substantially equal to half the displacement stroke of the movable cowl 20 between its closing position and its opening position. The allowance will preferably range between 5 and 10 mm.

This feature makes it possible to obtain the most significant rotation for the lever 50 while maintaining a slow rotation of the flap 30 so as to provide a constant total flow surface area of direct and reverse air flows throughout the deployment of the movable cowl 20 and the flap 30. Specifically, the ratio of the total flow surface area (direct flow and reverse flow) during the movement of the movable cowl and the pivoting of the flap 30 on the flow surface area in a direct jet mode (closed thrust reverser) remains close to unity.

However, such a configuration makes it possible to maintain a safety margin with respect to the alignment between the first link 51 and the lever 50. Indeed, if the first link 51 and the lever 50 came in almost perfect alignment, the driving mechanism 40 would then be in an unstable position, which is likely to prohibit re-closing of the flap at the end of the thrust reversal phase.

Obviously, depending on the lengths of links 51, 52 and the position of the associated articulation points, in particular that of the lever 50, it is possible to control in a very precise manner the kinematics of the pivoting of the flap. Depending on the associated thrust reverser device and turbojet engine, it is thus possible, for example, to implement a gradual pivoting flap at the beginning of the thrust reversal phase, when the reverse air flow is still relatively low. This will allow maintaining a total air flow rate between 0.95 and 1.25 times the air flow rate in a normal operating mode (direct jet) of the turbojet engine.

Figure 9:
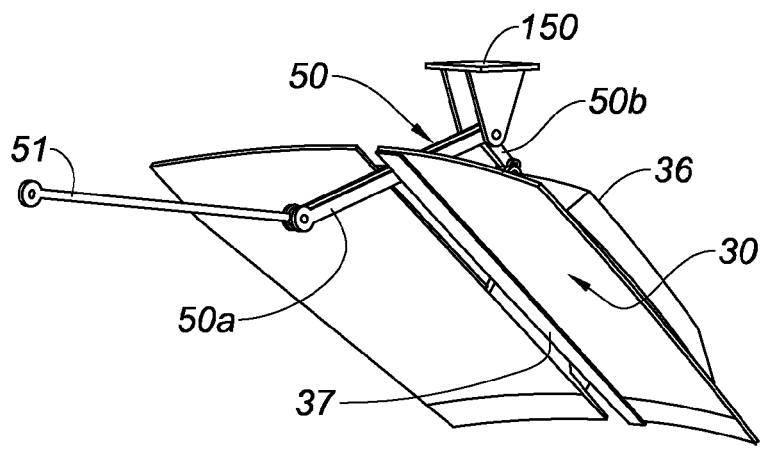
FIGS. 9 and 10 are partial perspective views shown from the bottom of the form of FIG. 2.
Figure 10:
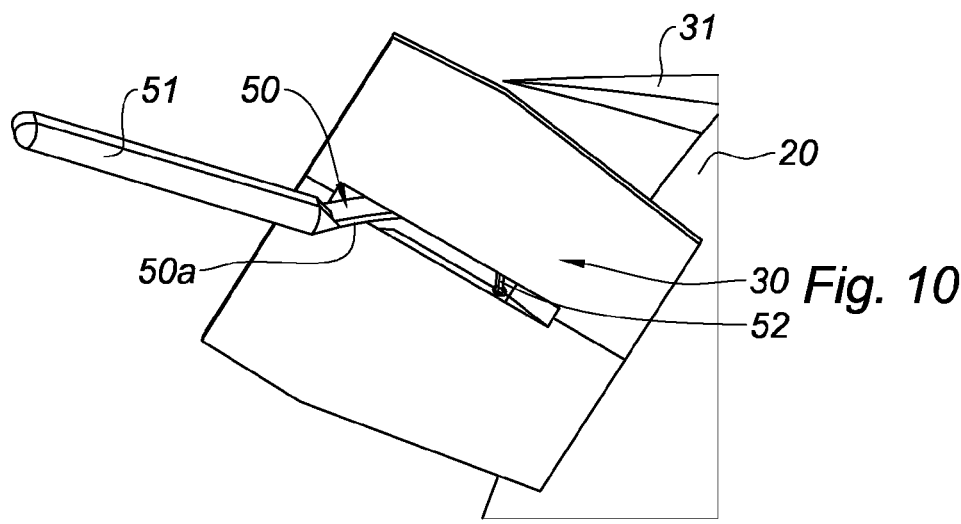

According to a first form more particularly shown in FIGS. 9 and 10, the driving system 40 is located in a substantially median plane of the flap 30.

Advantageously, the driving system will be housed, entirely or partly, in a folded position within the thickness of the flap 30. In such a configuration, the flap 30 is then substantially cut into two half-flaps by the housing of the driving system. It may then be necessary to provide for a structural reinforcement of the flap 30, particularly in the form of a bridge 36 connecting the two half-flaps.

According to a first form (FIG. 9), the driving system is entirely housed within the thickness of the flap 30 and the housing of the driving system in the flap 30 is equipped with a system of articulated valve 37 which, when the flap 30 is in the retracted position, provides the fairing of the aerodynamic surface of said flap in a direct jet mode. This valve 37 may be automatically maintained in a closed position by means of an elastic system. During the pivoting of the flap 30, the lever 50 forces the valve to open directly or by means of a mechanism.

This alternative form allows for carrying out the first link 51 with a substantially tubular section, which limits the obstruction of the surface of the thrust reversal cascades by this link 51 in a thrust reversal mode. The reverse air flow flowing more easily around a tubular link.

This form also allows improving the management of steps and gaps in the middle of the flap. The reconstitution of the aerodynamic surface of the flap 30 by the valve can be highly precise by dissociating the position of the valve and the position of the first folded link 51.

In contrast, in a pivoted position, the valve 37 will be exposed to the reverse air flow. It is therefore necessary to provide for a suitable reinforcement of its structure.

According to a second alternative form (FIG. 10), the first link 51 may be merely folded into the flow path along the flap 30.

In such a configuration, in a folded position in a direct jet mode, the first link 51 comes into the air flow along the flap 30. It will then be advantageously profiled in order to limit the associated aerodynamic losses.

This form allow for maintaining the structural integrity of the flap, the housing provided in the middle of the flap being merely intended to allow the passage of the lever 50. This housing is therefore shorter and does not in particular run along the entire length of the flap. It is no longer necessary to provide for a reinforcing bridge. This results in an obvious weight saving for the flap 30, and also an acoustic surface area gain through removing regions for fixing the reinforcing bridge on the half-flaps.

Figure 11:
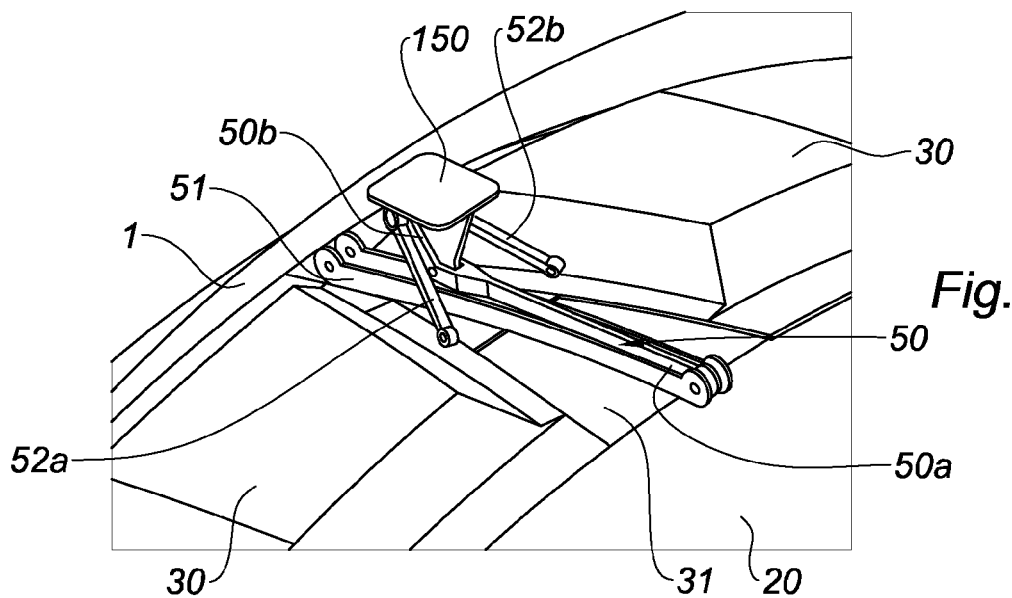
FIG. 11 is a partial perspective view shown from the top of the thrust reverser device according to a second form of the present disclosure.

According to a second form, schematically shown in FIG. 11, the driving mechanism is substantially located between two flaps 30.

Thus, a single driving mechanism may drive two flaps. To this end, it can be provided in particular that the second link 52 is made in the form of two short links 52a, 52b each connected to a flap 30.

This results in a significant weight saving as the number of driving systems may be reduced by half.

In addition, the structure of the flaps 30 is not affected, and it is not necessary to reinforce them. The acoustic surface is also optimal as the flaps are not cut into two halves.

Although the present disclosure has been described with a particular form, it is of course in no way limited thereto and includes all technical equivalents of the means described as well as their combinations if the latter fall within the scope of the present disclosure.

What is claimed is:

1. A thrust reverser device for a turbojet engine nacelle comprising at least one cowl mounted so as to move in a translational manner in a direction substantially parallel to a longitudinal axis of the nacelle between a closing position in which the cowl provides an aerodynamic continuity of the nacelle and covers deflecting means for deflecting at least one portion of an air flow of the turbojet engine, and an opening position in which the cowl opens a passage in the nacelle and uncovers said deflecting means, the cowl being associated with at least one blocking flap pivotally mounted at one end on the cowl between a retracted position corresponding to the closing position of said movable cowl and a pivoted blocking position corresponding to the opening position in which the blocking flap closes at least partially an air flow path of the nacelle, the blocking flap being equipped with at least one driving mechanism comprising at least one assembly forming a lever pivotally mounted on the cowl and articulated at each of ends thereof, by means of driving links, respectively on the blocking flap and on a fixed structure of the thrust reverser device, wherein the assembly and the driving links are articulated in an articulation plane substantially perpendicular to the blocking flap and substantially radial to the thrust reverser device.

2. The thrust reverser device according to claim 1, wherein the assembly forming the lever comprises a first and a second lever arms, each respectively fixed, by means of the driving links, on a front frame and on the flap and pivotally mounted on the cowl.

3. The thrust reverser device according to claim 1, wherein, when the thrust reverser device is in the opening position and the flap in the pivoted blocking position, the lever forms with the driving link, connected to the fixed structure of the thrust reverser device, an angle substantially equal to 160 degrees.

4. The thrust reverser device according to claim 3, wherein the angle is obtained by providing for a lever length substantially equal to half a stroke of the cowl between the closing position and the opening position.

5. The thrust reverser device according to claim 4, wherein the lever length ranges between 5 mm and 10 mm.

6. The thrust reverser device according to claim 1, wherein at least one portion of the lever and the driving links of the driving mechanism are adapted to imbricate into each other when the flap is in the retracted position.

7. The thrust reverser device according to claim 1, wherein the articulation plane of the driving mechanism comprises a center axis of the flap.

8. The thrust reverser device according to claim 7, wherein when the flap is in the retracted position, the driving mechanism is folded and housed substantially in a plane of the flap at the center axis of said flap.

9. The thrust reverser device according to claim 1, wherein the driving mechanism is substantially located between two flaps.

10. A nacelle of a turbofan engine comprising a thrust reverser device according to claim 1.

* * * * *